3,071,597
DERIVATIVES OF BICYCLO[2.2.2]OCT-2-ENE-1,4-DICARBOXYLIC ACID AND A PROCESS FOR THEIR FORMATION
James C. Kauer, Wilmington, Del., assignor to E. I. du Pont de Nemours and Company, Wilmington, Del., a corporation of Delaware
No Drawing. Filed May 16, 1960, Ser. No. 29,168
3 Claims. (Cl. 260—346.3)

This invention relates to new organic compounds containing a bridged ring system. More particularly, it relates to bridged ring compounds having reactive substituents at the bridgeheads and additional reactive substituents, and to a process of preparing these compounds.

The new products of this invention are bicyclo[2.2.2]oct-2-enes in which each of the carbon atoms in the 1- and 4-positions has as a substituent a carboxy, ester or acid halide group, and the carbon atoms in the 5- and 6-positions taken together have as substituents one carboxylic anhydride group.

These products therefore have the formula (I)
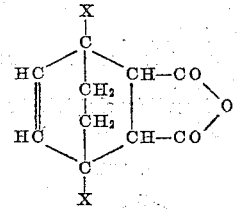

where X is carboxyl, —COOH; acyl halide (i.e., halocarbonyl), —CO-Hal.); or ester (i.e., hydrocarbyloxycarbonyl, —COOR). In these groups, Hal. represents a halogen, preferably chlorine; and R represents a hydrocarbon radical, preferably of 1 to 12 carbon atoms, and free from non-aromatic unsaturation.

The products of this invention are prepared by bringing in contact 2,3-dihydroterephthalic acid, or an ester or acid halide thereof, i.e., a 1,4-disubstituted-1,3-cyclohexadiene of the formula

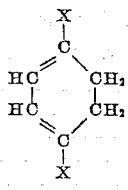

where X has the previously stated significance, with maleic anhydride, and heating the mixture at a temperature of at least 100° C. until the corresponding 1,4,5,6-tetrasubstituted bicyclo[2.2.2]oct-2-ene has formed. The diesters react much more readily than the free acid or acid halide, and they are therefore the preferred starting materials in this process.

The reaction that takes place is a Diels-Alder condensation, whereby the dienophile, i.e., maleic anhydride, adds to the conjugated system of the diene, i.e., the 2,3-dihydroterephthalic acid or derivative, at the 1,4-positions. It is represented by the equation:

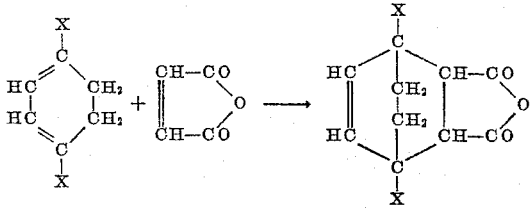

The process is carried out by mixing the reactants, preferably in approximately equimolar amounts, although an excess of one or the other can be used, and heating the mixture to a temperature of at least 100° C., and preferably in the range of 125–200° C., although higher temperatures, e.g., up to 300° C., can be used.

A solvent or reaction medium is not essential, particularly when using a 2,3-dihydroterephthalic compound which is liquid at the reaction temperature. However, it is often desirable to use a solvent to facilitate contact between the reactants. For this purpose, any inert organic liquid free of non-aromatic unsaturation and which is at least a partial solvent for the reactants at reaction temperature is suitable, for example, aliphatic or aromatic hydrocarbons and halohydrocarbons, acyclic or cyclic ethers, esters, and the like.

The reaction is most conveniently carried out at atmospheric pressure, preferably under reflux conditions. It can also be conducted in sealed vessels when the reactants and/or solvent, if any, are volatile at the operating temperature. Substantial conversions are normally achieved within about an hour in the preferred temperature range, and it is usually unnecessary to prolong the reaction beyond 8–16 hours, although longer reaction times may be required at lower temperatures. The reaction product is then isolated by any suitable conventional procedure such as distillation under reduced pressure after removal of the solvent, if any, solvent extraction, crystallization, etc.

Specific examples of 1,4,5,6-tetrasubstituted bicyclo[2.2.2]oct-2-enes which are obtained according to this invention by reacting maleic anhydride with the appropriate 2,3-dihydroterephthalic compound (acid, acid halide or ester) include, among others, the 1,4-disubstituted bicyclo[2.2.2]oct-2-ene-5,6-dicarboxylic anhydrides of Formula I above, in which compounds the substituents in the 1- and 4-positions are carboxy, —COOH; carbonyl chloride, —COCl; methoxycarbonyl, —COOCH₃; ethoxycarbonyl, —COOC₂H₅; propoxycarbonyl, —COOC₃H₇; isopropoxycarbonyl,

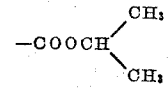

butoxycarbonyl, —COOC₄H₉; sec.-butoxycarbonyl,

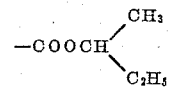

hexyloxycarbonyl, —COOC₆H₁₃; octyloxycarbonyl,

dodecyloxycarbonyl, —COOC₁₂H₂₅; cyclohexyloxycarbonyl, —COOC₆H₁₁; phenoxycarbonyl, —COOC₆H₅; p-toloxycarbonyl, —COOC₆H₄CH₃; naphthoxycarbonyl, —COOC₁₀H₇; benzyloxycarbonyl, —COOCH₂C₆H₅; and the like. As already mentioned, the diesters of 2,3-dihydroterephthalic acid are the preferred starting materials, and consequently the most readily accessible and therefore preferred products of the invention are those in which the groups in the 1- and 4-positions are ester (hydrocarbyloxycarbonyl) groups.

The invention is illustrated in greater detail by the following example.

*Example*

A mixture of 3 g. of dimethyl 2,3-dihydroterephthalate and 2 g. of maleic anhydride in 15 ml. of chlorobenzene was heated at reflux (about 135° C.) for 16 hours. On cooling the solution, a white crystalline solid precipitated which was separated by filtration and washed with chlorobenzene, then with n-pentane and dried. There was thus obtained 2.75 g. of a product melting at 188–188.6° C., which was 1,4-di(methoxycarbonyl)bicyclo[2.2.2]-oct-2-ene-5,6-dicarboxylic anhydride,

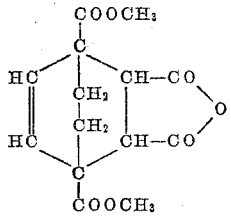

*Analysis.*—Calc'd for $C_{14}H_{14}O_7$: C, 57.14; H, 4.79; M.W., 294. Found: C, 57.70; H, 4.79; M.W., 285.

The structure of this product was confirmed by its infrared spectrum which showed the presence of both anhydride and ester functions. It was further established by the following degradative sequence of reactions: catalytic hydrogenation over platinum to 1,4-di-(methoxycarbonyl)bicyclo[2.2.2]octane-2,3-dicarboxylic anhydride (I); hydrolysis of the anhydride group of (I) with water to give 1,4-di(methoxycarbonyl)bicyclo[2.2.2]octane-2,3-dicarboxylic acid (II); oxidative bisdecarboxylation of (II) by treatment with lead tetraacetate to give 1,4 - di(methoxycarbonyl)bicyclo[2.2.2]oct - 2-ene (III),

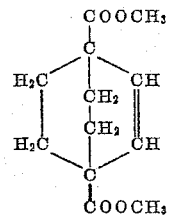

catalytic hydrogenation of (III) to 1,4-di(methoxycarbonyl)-bicyclo[2.2.2]octane (IV); and hydrolysis of (IV) with potassium hydroxide, followed by acidification, to give bicyclo[2.2.2]octane-1,4-dicarboxylic acid.

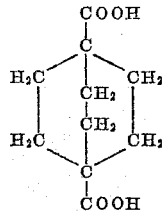

This last compound was found, by comparison of infrared spectra, to be identical with an authentic sample of bicyclo[2.2.2]octane-1,4-dicarboxylic acid prepared by the method of Roberts, Moreland and Frazer, J. Am. Chem. Soc. 75, 637 (1953).

1,4 - dicarboxybicyclo[2.2.2]oct-2-ene-5,6-dicarboxylic anhydride and its esters lead, by reaction with glycols, if desired preceded by imidation of the anhydride group, to high-softening condensation products of the alkyd type for use in finishes or coatings. They are also valuable curing agents for epoxy resins such as the condensation product of bis(4-hydroxyphenyl)-2,2-propane with epichlorohydrin. In these uses, the anhydrides can be used as such, or they can be first hydrolyzed to the corresponding tetracarboxylic acid, 1,4,5,6-tetracarboxybicyclo[2.2.2]oct-2-ene.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. 1,4 - disubstitutedbicyclo[2.2.2]oct-2-ene-5,6-dicarboxylic anhydrides having the formula

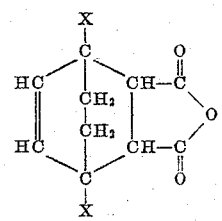

where X is a member of the group consisting of carboxyl, chlorocarbonyl and COOR, and where R is a hydrocarbon radical of 1 to 12 carbon atoms and free from non-aromatic unsaturation.

2. 1,4 - disubstitutedbicyclo[2.2.2]oct-2-ene-5,6-dicarboxylic anhydrides having the formula

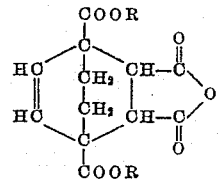

where R is a hydrocarbon radical of 1 to 12 carbon atoms and free from non-aromatic unsaturation.

3. 1,4 - di(methoxycarbonyl)bicyclo[2.2.2]oct - 2-ene-5,6-dicarboxylic anhydride.

References Cited in the file of this patent

UNITED STATES PATENTS

| | | |
|---|---|---|
| 1,944,731 | Diels et al. | Jan. 23, 1934 |
| 2,794,811 | Winstrom | June 4, 1957 |
| 2,832,796 | Hoehn | Apr. 29, 1958 |
| 2,850,519 | Krimm | Sept. 2, 1958 |
| 2,887,497 | Hodes | May 19, 1959 |

OTHER REFERENCES

Bergmann: Chemistry of Acetylene and Related Compounds (1948), page 80.